United States Patent Office 3,320,576
Patented May 16, 1967

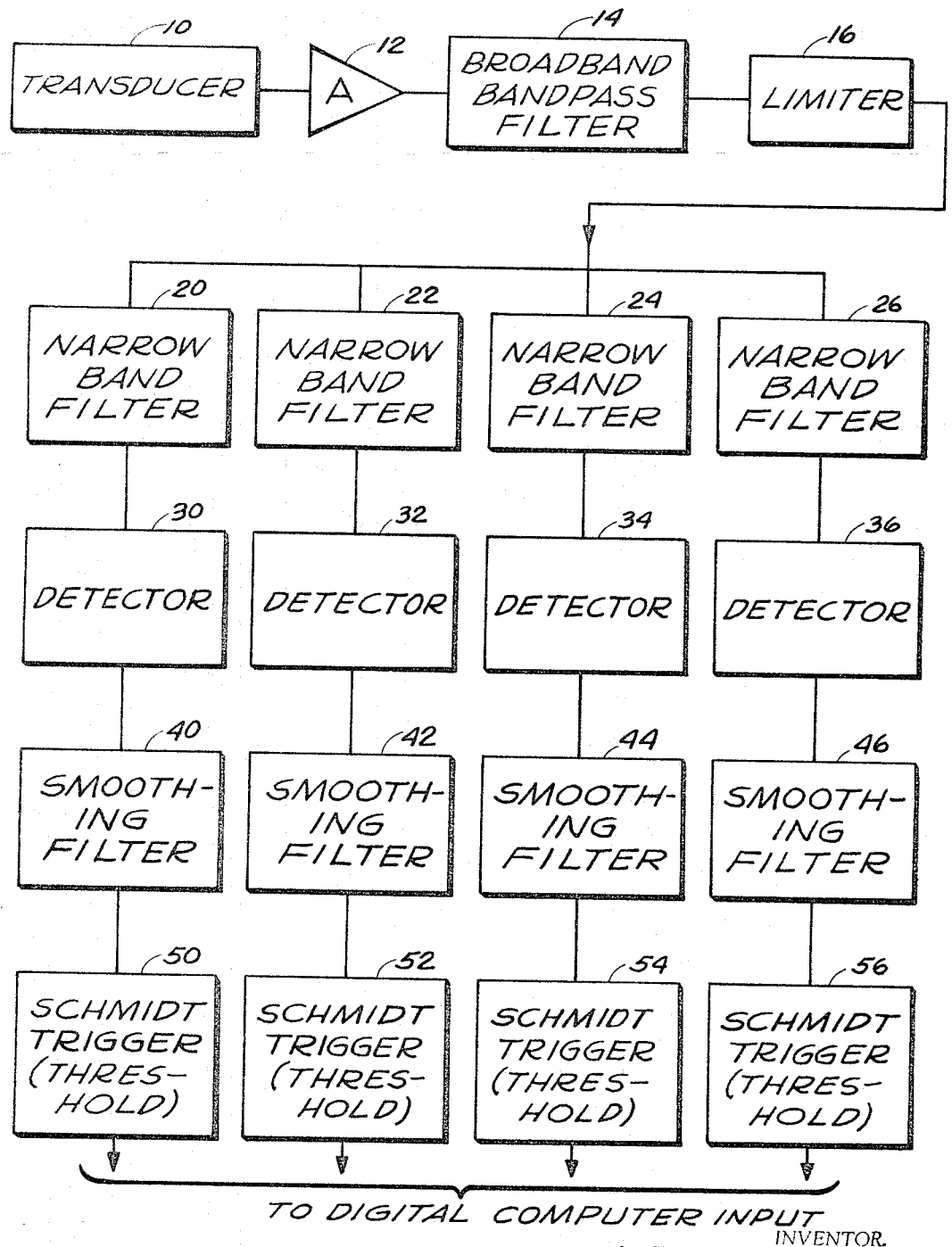

3,320,576
RECEIVER FOR PROCESSING A PLURALITY OF ADJACENT CLOSELY SPACED INPUT SIGNALS
Alexander M. Dixon, Burbank, and Reginald J. Cyr, Woodland Hills, Calif., assignors to The Bendix Corporation, a corporation of Delaware
Filed Mar. 30, 1965, Ser. No. 443,984
6 Claims. (Cl. 340—5)

This invention relates to a receiver for receiving and amplifying input signals and more particularly to such a receiver which is capable of receiving and separating a plurality of input signals which may be received at very close frequency intervals in the presence of a high level of background noise of great dynamic range.

There are a number of situations where it is useful to be able to discriminate among a plurality of input pulses of different frequencies which may carry different information, but which may be arriving at the receiver input at very closely spaced intervals and in random sequence. One such situation appears in connection with the processing of inputs from a plurality of underwater transponders or transmitters which are designed to respond to an interrogating signal from a ship's transducer. Such transponders are located on the ocean floor in known locations, and each emits a pulse having a characteristic frequency when interrogated. By knowing the time of transmission of an interrogating pulse and the time required to receive a reply from any given transponder, the distance form the ship to the transponder can be calculated. Where a plurality of transponders all respond to the interrogating pulse, the information available at the ship makes it possible, through triangulation techniques, to determine the exact position of the ship in relation to the known positions of the transponders. This requires a clear-cut separation and identification of the individual input pulses. These pulses are then used to provide input information to a digital computing device which does the actual computation of the ship's location.

There are a number of problems which are encountered in the use of the above described technique, however. When dealing with acoustic signals in the ocean, there is a constant background noise problem. Marine life and ships produce sounds, the intensity or amplitude of which may be greater at the receiver input than that of the desired signal. Underwater explosion cause sonic signals of great amplitude which may cause "false alarms." There is also a need to limit the band width used, since the underwater transducer which convert acoustic energy to electrical energy for the receiver have a comparatively narrow frequency range. In order to avoid the use of a number of transducers with the necessary switching structure, it is highly desirable that the available band width of a single transducer be utilized as efficiently as possible. There are, of course, certain frequencies known to be used by other equipment which it is desirable to avoid. The conventional approach to meeting these requirements has been to use a receiver having an automatic gain control circuit in combination with conventional narrow band filters having sharp characteristics to discriminate against adjacent channels. It has been determined that because of the large dynamic range of the received signals, conventional filter circuits do not alone provide the desired discrimination presently needed for the above-described application, since such circuits have a typical "skirt" characteristic permitting the passage of some frequencies which are considerably removed from their center frequency. Where adjacent signals may be many times greater in magnitude than the signal which it is intended to pass, such adjacent signals may also pass through the filter, creating errors through energizing of a wrong logic circuit or through creation of other types of spurious responses. The applicants have found that far better performance, giving a predictable probability of detection and a very low "false alarm" rate, can be provided by means of a receiver design utilizing, in series, a broad band input filter to minimize reception of frequencies outside the range of all frequencies which it is desired to receive, a full limiter which is a very high gain clipping amplifier and which has a substantially constant amplitude (and energy) output, a plurality of narrow band filters connected to said output which respond only to their specific frequencies and which recognize the existence of a pulse in their frequency range by producing a higher energy output, and a plurality of threshold-responsive multivibrator circuits which respond to the higher energy output of the corresponding narrow band filter to produce an output pulse to the digital computing device but which produces no output in response to a lower level input from the narrow band filter which represents only noise. It is, theerfore, an object of the present invention to provide a receiivng system which is capable of distinguishing among a number of input signals which are more closely spaced along the frequency spectrum than can prior art receivers, thus providing substantially better utilization of the available band width.

It is another object of the present invention to provide a receiving system which can identify a desired input signal and separate it from other such input signals or from noise despite the existence of an environment in which noise amplitudes may greatly exceed the amplitude of the desired signal.

It is another object of the present invention to provide a receiving system for receiving closely spaced adjacent input signals with a predictable probability of detection and false alarm rate.

It is a further object of the present invention to provide a receiving system which accomplishes the above objectives and which produces an output which is suitable as an input for a digital computer device.

Other objects and advantages will become apparent from consideration of the following specification taken in connection with the accompanying drawing in which:

The single figure is a block diagram of a receiving system incorporating our invention.

Referring now to the drawing, a transducer 10 is shown which may be a typical underwater transducer of either the electroceramic or magnetostrictive type and which is typically mounted on the hull of a ship below the water line. Transducer 10 receives acoustic signals, converts them to electrical signals and supplies them to an amplifier 12, where they are amplified before being supplied to a broad band filter 14. It is the function of broad band filter 14 to exclude all noise and other frequency inputs which are substantially outside the frequency range of all of the desired input signals. Such a filter should have a flat characteristic such that it does not appreciably favor or discriminate against any particular desired input signal. The output of this filter 14 at any given instant contains all of the noise in its pass band plus any input pulses received at transducer 10. This output would be supplied to a limiter 16 which is essentially a very high gain clipping amplifier. This limiter should be of such design that its output is constantly saturated even with no input other than background noise. Such noise is, however, distributed in random fashion across the frequency spectrum passed by the limiter, but a signal pulse will appear as a concentrated burst of energy over a specific narrow frequency range within this spectrum. Such limiters are well known in the art and need not be described in detail.

Connected to the output of limiter 16 are a plurality of narrow band filters 20, 22, 24 and 26, each of which is designed to pass only frequencies in a narrow range about the frequency of an input signal from a particular transponder. The pass band of such filters should be substantially narrower, perhaps one-tenth of that of filter 14. When a signal from one of the transponders appears at the output of limiter 16, it passes through the appropriate narrow band filter which then has an energy output substantially higher than is the case when the usual background noise passes through. There is an important relationship between the band widths of the broadband filter 14 and the narrow band filters which makes it possible to place the adjacent input signals much closer together than could be accomplished with conventional techniques. With the system described herein, the adjacent channel rejection of the narrow band filters need be only substantially equivalent to the ratio in decibels of the band width of the broadband filter to the band width of a narrow band filter.

This signal is then supplied through a detector which is one of detectors 30, 32, 34 and 36 connected to the outputs of the narrow band filters and through one of a plurality of smoothing filter circuits 40, 42, 44 and 46 before appearing at the input of one of a number of corresponding threshold-responsive pulse-generating circuits, which may be Schmidt trigger circuits 50, 52, 54 and 56. The detector and smoothing filter circuits may not always be required, depending upon how closely the characteristics of the input pulses match those of the narrow band filters and upon the need for the improvement gained by full wave rectification of the outputs of the narrow band filters, but they have been included herein since they have proved useful in improving the effective signal-to-noise ratio. The outputs of the several trigger circuits 50, 52, 54 and 56 consist of pulses which are supplied as a digital input to a digital computing device. These pulses, of course, appear at the input to the computer in essentially the same time relationship as they appeared at transducer 10. The computer, having also been supplied with the time of the interrogating pulse, can then compute the position of the ship from the information supplied by the transponders.

While only a single embodiment has been shown and described herein, it is recognized that numerous modifications may be made which are within the scope of the appended claims. And while the embodiment described provides means for distinguishing a plurality of input signals from each other and from noise, the arrangement taught herein is also useful where a single input frequency is used and must be distinguished from noise including large amplitude noise peaks which may, at least momentarily, be in the frequency range of the input signal.

We claim:

1. A system for processing a plurality of input signal pulses of different, closely-spaced frequencies in a high noise environment, comprising transducer means for converting said signals to alternating current electrical pulse signals,
   amplification means for amplifying the output of said transducer means,
   a broadband bandpass filter connected to said amplification means for excluding frequencies substantially outside the frequency range of said plurality of input signals,
   a limiter connected to said broadband filter which is of such high gain that it is substantially fully amplitude-limited even on the normal noise input such that its output is essentially at a constant energy level wherein said signal pulses appear at said output as a concentration of energy over a narrow part of the pass band of said broadband filter,
   a plurality of narrow band filters, one covering the frequency of each of said pulse signals, connected to the output of said limiter, each of said narrow band filters having a fixed bandwidth ratio to said broadband filter,
   detecting and filtering means for effecting full-wave rectification of the outputs of said narrow band filters,
   and threshold-responsive pulse-generating circuit means connected to said detecting and filtering means for producing output pulses whenever the amplitude of the signal from said detecting and filtering means is sufficiently great to indicate the presence of an input signal pulse.

2. A system for processing a plurality of input signal pulses of different, closely-spaced frequencies in a high noise environment comprising a broadband bandpass filter for excluding frequencies outside the frequency range of said input signals,
   a limiter connected to said broadband filter which is of sufficiently high gain that it is substantially fully amplitude-limited with its output at essentially a constant energy level wherein said signal pulses appear at said output as a concentration of energy over a narrow part of the pass band of said broadband bandpass filter,
   a plurality of narrow band filters, one covering the frequency of each of said input signal pulses, connected to the output of said limiter, each of said narrow band filters having a fixed bandwidth ratio to said broadband filter,
   and threshold-responsive pulse-generating means for receiving the outputs of said narrow band filters for producing an output whenever the outputs of said narrow band filters are of sufficient amplitude to indicate the presence of an input signal pulse.

3. A system for processing input signals consisting of a plurality of acoustic pulses of different closely-spaced frequencies in a high noise environment comprising transducer means for converting said acoustic pulses to alternating current electrical pulse signals,
   a broadband bandpass filter connected to receive said electrical pulse signals and to exclude frequencies outside the frequency range of said pulse signals,
   a high gain limiter connected to the output of said bandpass filter having an output which is essentially fully limited and wherein said pulse signals appear at said output as a concentration of energy over a narrow part of the frequency range of said output,
   a plurality of narrow band filters, one covering the frequency of each of said pulse signals, connected to the output of said limiter, each of said narrow band filters having a fixed bandwidth ratio to said broadband filter,
   and threshold-responsive pulse-generating circuit means connected to said narrow band filters for producing output pulses whenever the energy level of the outputs of the narrow band filters are such as to indicate the presence of a pulse signal.

4. A system for receiving and amplifying a sonic input pulse of a specific frequency in a high noise environment comprising a transducer for receiving said sonic input pulse and for converting said pulse to an alternating current electrical pulse signal,
   a broadband bandpass filter connected to receive said electrical pulse signal,
   a limiter connected to said broadband bandpass filter having an output which is essentially fully limited and wherein said pulse signal appears at said output as a concentration of energy over a small part of the frequency range of said output,
   a narrow band filter covering the frequency of said pulse signal connected to the output of said limiter, the pass band of said filter being substantially less than that of said broadband filter and bearing a fixed bandwidth ratio to said broadband filter,
   and threshold-responsive pulse-generating circuit means connected to said narrow band filter for producing an output pulse whenever the output of the narrow band filter is of such energy level as to indicate the presence of a said pulse signal.

5. A system for processing a plurality of input signal pulses of different, closely spaced frequencies comprising a broadband bandpass filter for excluding frequencies outside the frequency range of all of said input signal pulses,
a limiter connected to said bandpass filter having an output which is essentially fully limited,
a plurality of narrow band filters connected to the output of said limiter, each of said narrow band filters having a bandpass characteristic which bears a fixed bandwidth ratio to said broadband filter and which includes the frequency of a particular input signal pulse,
and threshold-responsive pulse-generating circuit means connected to said narrow band filters for producing output pulses whenever the energy level at the outputs of said narrow band filters are such as to indicate the presence of a pulse signal.

6. A system for receiving and amplifying an input pulse of a specific frequency in a high noise environment comprising a broadband bandpass filter,
a limiter connected to said bandpass filter having an output which is essentially fully limited,
a narrow band filter connected to the output of said limiter having a bandpass characteristic which covers the frequency of said input pulse and which bears a fixed bandwidth ratio to the broadband filter.
and threshold-responsive pulse-generating circuit means connected to said narrow band filter for producing an output pulse whenever the energy level at the output of said narrow band filter is such as to indicate the presence of a pulse signal.

References Cited by the Examiner
UNITED STATES PATENTS

| | | | |
|---|---|---|---|
| 2,476,445 | 7/1949 | Lacy | 179—1 |
| 2,724,817 | 11/1955 | Hisserich | 340—3 |
| 3,128,349 | 4/1964 | Boesch et al. | 340—171 |
| 3,149,333 | 9/1964 | Campbell | 343—17.1 |
| 3,213,410 | 10/1965 | Hagemann | 340—5 |
| 3,215,934 | 11/1965 | Sallen | 324—77 |

CHESTER L. JUSTUS, *Primary Examiner.*

R. A. FARLEY, *Assistant Examiner.*